US008893355B2

(12) United States Patent
Longley et al.

(10) Patent No.: US 8,893,355 B2
(45) Date of Patent: Nov. 25, 2014

(54) TURN COLLAR FULCRUM HANDLE SYSTEM

(71) Applicant: Marlon Holdings Inc., Surrey (CA)

(72) Inventors: Mark Kenneth Longley, Richmond (CA); Anne Margaret Longley, Richmond (CA)

(73) Assignee: Marlon Holdings Inc., Surrey, Britiish Columbia (CA)

( * ) Notice: Subject to any disclaimer, the term of this patent is extended or adjusted under 35 U.S.C. 154(b) by 0 days.

(21) Appl. No.: 13/836,388

(22) Filed: Mar. 15, 2013

(65) Prior Publication Data

US 2013/0269153 A1 Oct. 17, 2013

Related U.S. Application Data

(60) Provisional application No. 61/625,566, filed on Apr. 17, 2012.

(51) Int. Cl.
*B25G 1/00* (2006.01)
*A01B 1/00* (2006.01)
*B25G 3/20* (2006.01)
*B25G 1/06* (2006.01)

(52) U.S. Cl.
CPC .. *B25G 1/00* (2013.01); *B25G 3/20* (2013.01); *B25G 1/06* (2013.01)
USPC ............................................... 16/426; 294/58

(58) Field of Classification Search
CPC ............ B25F 5/026; B25G 1/00; B25G 1/04; B25G 1/102; B25G 1/105; B25G 3/38; B05C 17/0205; E05B 1/0015; A01B 1/026; A01B 1/02; B65B 67/1238; A46B 5/0075; A46B 17/02; A46B 5/02; A46B 2200/302; A47L 13/08; A47L 13/022
USPC .............. 16/426, 427, 429, 430, 436; 294/58, 294/178; 15/144.1, 144.4, 143.1, 236.01, 15/159.1
See application file for complete search history.

(56) References Cited

U.S. PATENT DOCUMENTS

| | | | | | |
|---|---|---|---|---|---|
| 85,956 | A | | 1/1869 | Pinkham | |
| 715,056 | A | * | 12/1902 | Gruner | 294/58 |
| 730,119 | A | * | 6/1903 | Hanson et al. | 248/78 |
| 933,647 | A | * | 9/1909 | Hunt | 294/58 |
| 1,182,412 | A | * | 5/1916 | Olesberg | 141/314 |
| 1,411,435 | A | * | 4/1922 | Hosmer | 172/611 |
| 1,600,858 | A | * | 9/1926 | Wright | 172/378 |

(Continued)

FOREIGN PATENT DOCUMENTS

CA 2275039 C 1/2000

*Primary Examiner* — Victor Batson
*Assistant Examiner* — Jason W San
(74) *Attorney, Agent, or Firm* — Bereskin & Parr LLP/S.E.N.C.R.L., s.r.l.

(57) ABSTRACT

A handle for use with and/or for releasably coupling to an implement. The handle may include: a handgrip, an arm operatively coupled to the handgrip, and a collar operatively coupled to the arm remote from the handgrip. The collar may be configured to releasably receive a shaft of the implement. The collar may comprise two substantially opposing collar portions defining a shaft pathway, wherein the collar portions are displaced axially along the shaft pathway to form a key-way sized to receive the shaft when the shaft and the shaft pathway are substantially orthogonal to each other. A set of handles may also be provided, with one handle having a shorter arm length than the other.

15 Claims, 14 Drawing Sheets

(56) References Cited

U.S. PATENT DOCUMENTS

Figure 1:
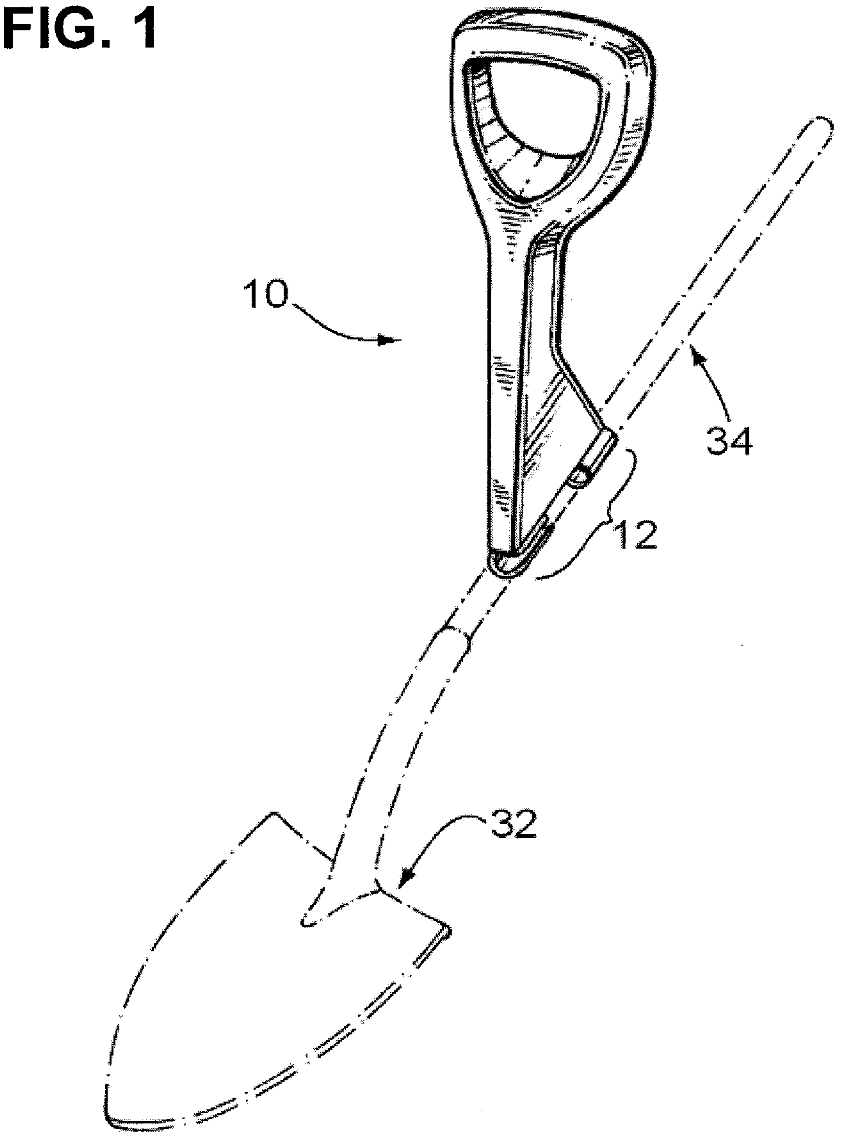

| | | | | | |
|---|---|---|---|---|---|
| 1,808,328 | A | | 6/1931 | Thomson | |
| 1,966,702 | A | * | 7/1934 | Barstad | 15/145 |
| 2,536,607 | A | * | 1/1951 | Jenkins | 56/400.17 |
| 2,605,945 | A | * | 8/1952 | Dechar | 294/146 |
| 2,653,840 | A | * | 9/1953 | Bitzer et al. | 403/333 |
| 3,277,966 | A | | 10/1966 | Ward | |
| 3,650,579 | A | | 3/1972 | Sable | |
| 4,155,582 | A | * | 5/1979 | Reisner | 294/58 |
| 4,343,518 | A | | 8/1982 | Pourchot | |
| 4,537,433 | A | * | 8/1985 | Yang | 294/58 |
| 4,575,163 | A | | 3/1986 | Sable | |
| 4,632,468 | A | | 12/1986 | Wilson et al. | |
| 4,655,492 | A | * | 4/1987 | Landry | 294/15 |
| 4,659,125 | A | * | 4/1987 | Chuan | 294/19.2 |
| 4,958,407 | A | * | 9/1990 | Johnson | 16/426 |
| 5,065,475 | A | * | 11/1991 | Watt | 16/426 |
| 5,191,938 | A | | 3/1993 | Sable et al. | |
| 5,199,758 | A | * | 4/1993 | Howell | 294/171 |
| 5,299,475 | A | * | 4/1994 | Stroop | 81/489 |
| 5,299,720 | A | * | 4/1994 | Koch, III | 224/406 |
| D347,986 | S | * | 6/1994 | Booth | D8/107 |
| 5,437,122 | A | * | 8/1995 | Wilson | 43/21.2 |
| 5,447,349 | A | * | 9/1995 | Coble | 294/58 |
| 5,499,852 | A | * | 3/1996 | Seigendall | 294/58 |
| 5,669,650 | A | * | 9/1997 | Rutz | 294/58 |
| 5,806,903 | A | * | 9/1998 | George | 294/92 |
| D417,382 | S | * | 12/1999 | Saladino, Jr. | D8/107 |
| 6,101,657 | A | * | 8/2000 | Hamilton | 15/145 |
| 6,203,081 | B1 | * | 3/2001 | Kegan, Sr. | 294/59 |
| 6,461,074 | B2 | * | 10/2002 | Taylor | 403/378 |
| 6,536,301 | B1 | * | 3/2003 | Luksch et al. | 74/543 |
| 6,634,823 | B2 | * | 10/2003 | Sciortino | 403/13 |
| 6,701,623 | B2 | * | 3/2004 | Sanders | 30/276 |
| 6,798,348 | B1 | * | 9/2004 | Wilker et al. | 340/691.1 |
| 6,802,150 | B2 | * | 10/2004 | Harden | 43/21.2 |
| 6,830,271 | B2 | * | 12/2004 | Piscopo et al. | 294/58 |
| 6,955,371 | B2 | * | 10/2005 | French | 280/279 |
| 7,070,218 | B2 | * | 7/2006 | Bercaw et al. | 294/15 |
| 7,300,081 | B1 | * | 11/2007 | Murray et al. | 294/58 |
| 7,331,620 | B2 | * | 2/2008 | Wang | 294/58 |
| 7,434,318 | B2 | * | 10/2008 | Perez et al. | 30/169 |
| 7,458,133 | B2 | * | 12/2008 | Wing | 16/412 |
| 7,549,713 | B2 | * | 6/2009 | Gose et al. | 312/405 |
| 7,559,119 | B2 | * | 7/2009 | Wing | 16/412 |
| 7,637,882 | B2 | * | 12/2009 | Carman et al. | 602/21 |
| 7,677,140 | B2 | * | 3/2010 | Hull et al. | 81/177.2 |
| 7,694,392 | B2 | * | 4/2010 | Touchette | 16/430 |
| 7,789,369 | B2 | * | 9/2010 | Jahnz | 248/540 |
| 7,866,004 | B1 | * | 1/2011 | Hermann | 16/426 |
| 7,971,914 | B1 | * | 7/2011 | Pladson | 294/58 |
| 8,016,517 | B1 | * | 9/2011 | Pardue | 404/118 |
| 8,042,849 | B2 | * | 10/2011 | Pratt | 294/19.3 |
| 8,453,296 | B2 | * | 6/2013 | Swerdlick | 15/410 |
| 2003/0057721 | A1 | * | 3/2003 | Ducklow | 294/58 |
| 2003/0074765 | A1 | * | 4/2003 | Quimby | 16/426 |
| 2004/0196156 | A1 | * | 10/2004 | Wilker et al. | 340/691.1 |
| 2005/0206178 | A1 | * | 9/2005 | Hoeft | 294/58 |
| 2010/0175225 | A1 | * | 7/2010 | Sanchez Santos et al. | 16/426 |
| 2012/0048074 | A1 | * | 3/2012 | Mosher | 81/489 |
| 2012/0324676 | A1 | * | 12/2012 | Guerra | 16/426 |
| 2013/0269131 | A1 | * | 10/2013 | Mallett | 15/144.1 |

* cited by examiner

TURN COLLAR FULCRUM HANDLE SYSTEM

PRIORITY

This application claims priority from U.S. Provisional Patent Application No. 61/625,566, filed Apr. 17, 2012, which is incorporated by reference herein in its entirety.

FIELD

This invention relates generally to detachable auxiliary handles for use with long shaft implements such as shovels, rakes, pitchforks, brooms, etc.

BACKGROUND

Snow shoveling can be an especially painful experience due to low back disc compression from repeated bending and lifting of heavy snow loads (the average shovelful of snow weighs 15-25 pounds). Each year over 100,000 people in North America end up in emergency rooms, clinics and doctors' offices due to injuries related to snow shoveling; sadly over 100 people suffer cardiac arrest and die. The shovel is ubiquitous, yet its design has remained relatively unchanged for thousands of years. The majority of households in North America have at least one long shaft tool that, due to design, will cause some level of back strain due to inappropriate bending or excessive spinal loading.

Accordingly, the applicants have recognized a need for improved systems and methods for facilitating the use of various implements.

BRIEF SUMMARY OF THE INVENTION

The Turn Collar Fulcrum Handle System described herein may provide a single light weight fulcrum handle with no moving parts, complicated assembly or tools required to releasably attach it to long shaft tools. The Turn Collar Fulcrum Handle is a simple click on/click off design that may be moved from one tool to another tool. The Turn Collar Fulcrum Handle can be placed adjacent to the load (e.g. a shovel full of snow), thereby reducing the lifting effort which may be required and which may also reduce the need for the user to bend.

Light weight versions of the Turn Collar Fulcrum Handle may be used for brooms, mops, rakes, etc., while a heavy duty J-hook turn collar configuration may be used for lifting heavier loads that require optimal ergonomic support, while a version with a shorter or no fulcrum arm can attach to long shaft tools that did not come with an end handle by attaching with the unique locking turn collar. In summary, an easily repositionable turn collar fulcrum handle will ensure continued use when and where it is needed in order to provide optimal ergonomics and safe lifting when using long shaft tools to lift loads that can cause pain, fatigue and repetitive stress or back injuries.

The described embodiments relate to auxiliary or fulcrum handles which may be releasably coupled to tools and other implements.

In one broad aspect, there is provided a handle for use with and/or for releasably coupling to an implement. The handle may include: a handgrip, an arm operatively coupled to the handgrip, and a collar operatively coupled to the arm remote from the handgrip. The collar may be configured to releasably receive a shaft of the implement. The collar may comprise two substantially opposing collar portions defining a shaft pathway, wherein the collar portions are displaced axially along the shaft pathway to form a keyway sized to receive the shaft when the shaft and the shaft pathway are substantially orthogonal to each other.

In some instances, the collar portions may be curvilinear. As well, in some implementations, the handle may include a support portion, wherein the shaft pathway is intermediate or between the support portion and the handgrip.

In some embodiments, the collar comprises a reinforced spine. The shaft pathway may be positioned between the spine and the handgrip.

The collar may include a support and the shaft pathway may be positioned between the support and the handgrip.

In some instances, the collar may comprise a J-hook configuration.

A sizing insert may be provided which is configured to seat within the collar. The collar may be configured to receive a sizing insert. In some such implementations, the sizing insert may comprise a nub and wherein the collar comprises a dimple configured to receive the nub.

For some embodiments, the arm may be configured for telescopic extension.

Another broad aspect may be directed towards a set of handles for simultaneous use with an implement. Each handle in the set may comprise: a handgrip, an arm operatively coupled to the handgrip, and a collar operatively coupled to the arm remote from the handgrip and configured to releasably receive a shaft of the implement. The collar may include: two substantially opposing collar portions defining a shaft pathway, wherein the collar portions are displaced axially along the shaft pathway to form a keyway sized to receive the shaft when the shaft and the shaft pathway are substantially orthogonal to each other. The set may comprise a first handle and a second handle, and the arm of the first handle is of a different length than the arm of the second handle.

In some implementations, the collar portions may be curvilinear.

One or both of the first and second handles may comprise a support portion, wherein the shaft pathway is intermediate the support portion and the handgrip.

In some instances, one or both of the first and second handles may be configured such that the collar comprises a reinforced spine. In such a configuration, the shaft pathway may be positioned between the support and the handgrip.

In some implementations, for at least one handle in the set, the collar comprises a J-hook configuration.

The set may also include a sizing insert configured to seat within the collar of at least one handle in the set. In some instances, the collar of at least one handle in the set is configured to receive a sizing insert. The sizing insert may comprise a nub and the collar of the at least one handle in the set may comprise a dimple configured to receive the nub.

For some embodiments, the arm of at least one handle in the set may be configured for telescopic extension.

These and other aspects and features of various embodiments will be described in greater detail below, with reference to the figures in which like numbers correspond to like references throughout.

DRAWINGS

Embodiments are described in further detail below, by way of example only, with reference to the accompanying drawings, in which:

FIG. 1 shows a Front Isometric view of a Turn Collar Fulcrum Handle according to one aspect, mounted on the shaft of a representative implement in the form of a shovel.

Figure 2A:
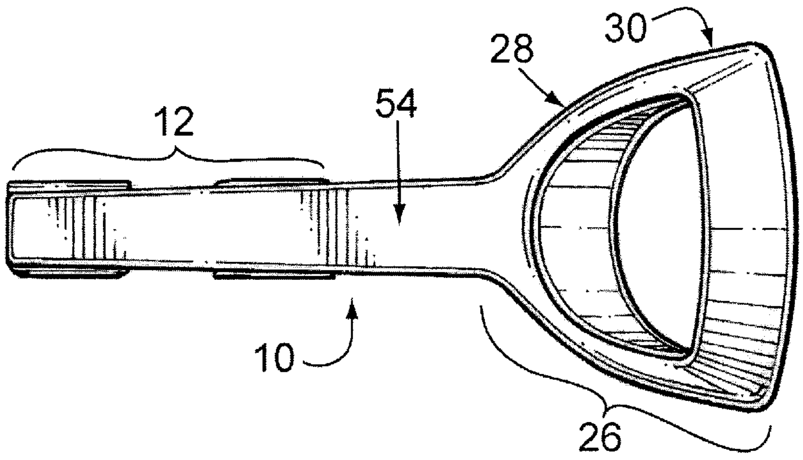

FIG. 2*a* shows a Top view of the Handle of FIG. 1.

Figure 2B:
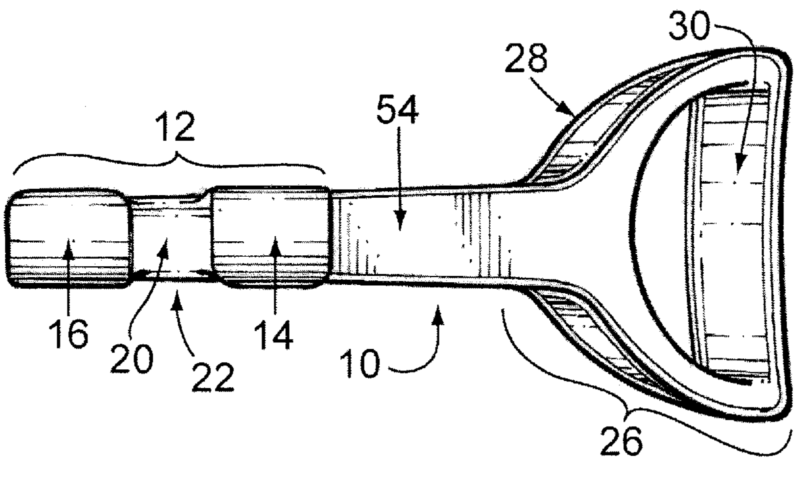

FIG. 2*b* shows a Bottom view of the Handle of FIG. 1.

Figure 3A:
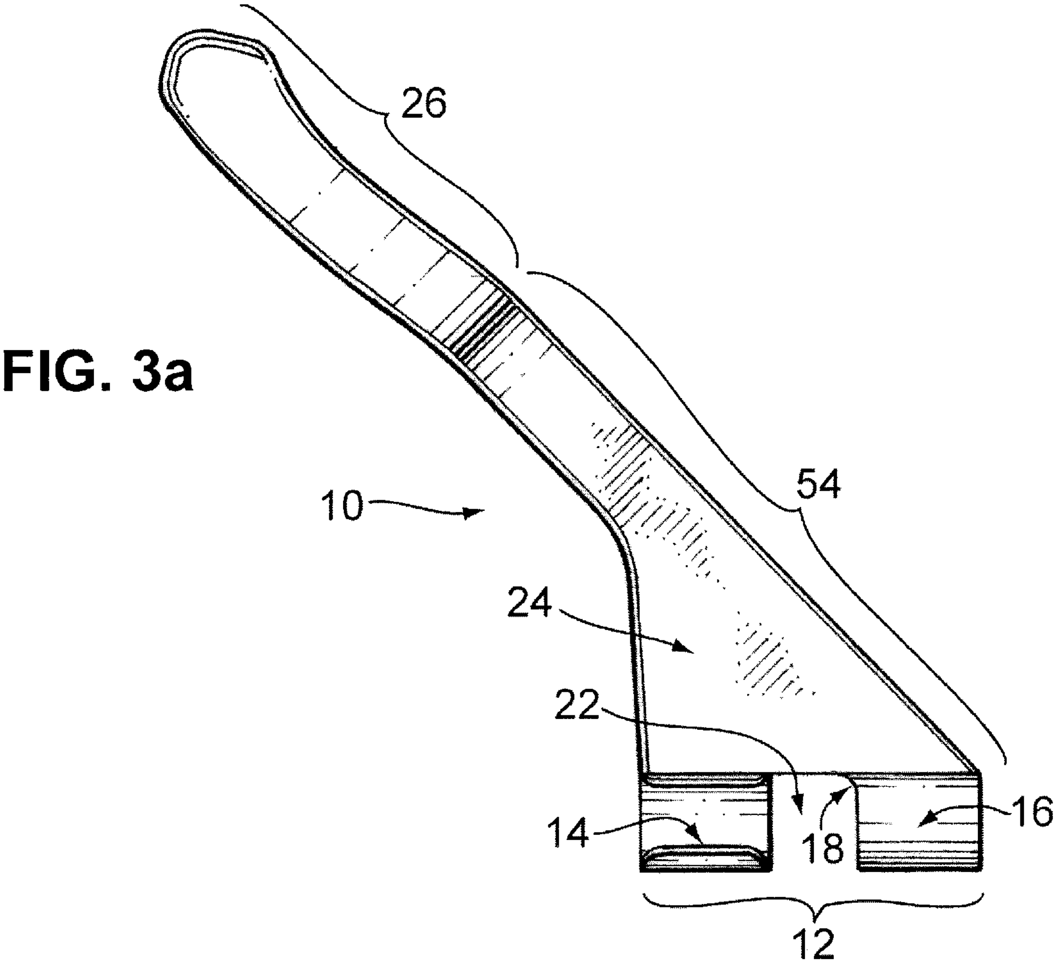

FIG. 3*a* shows a Right Side view of the Handle of FIG. 1.

Figure 3B:
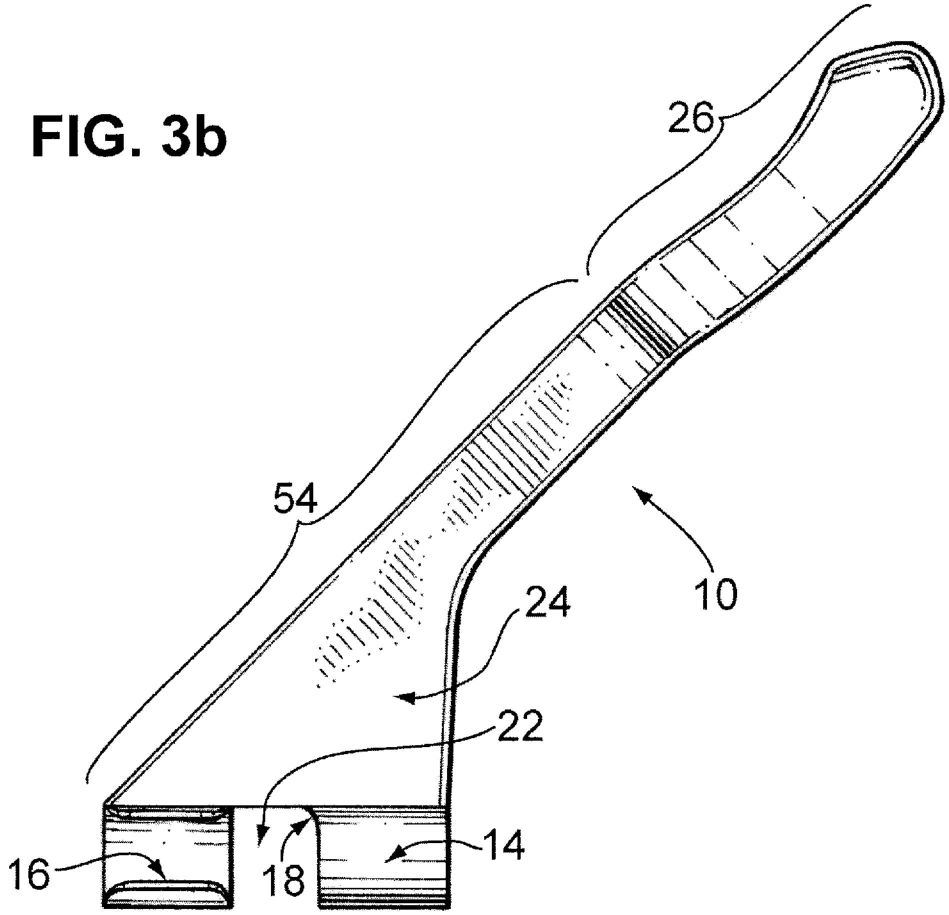

FIG. 3*b* shows a Left Side view of the Handle of FIG. 1.

Figure 4A:
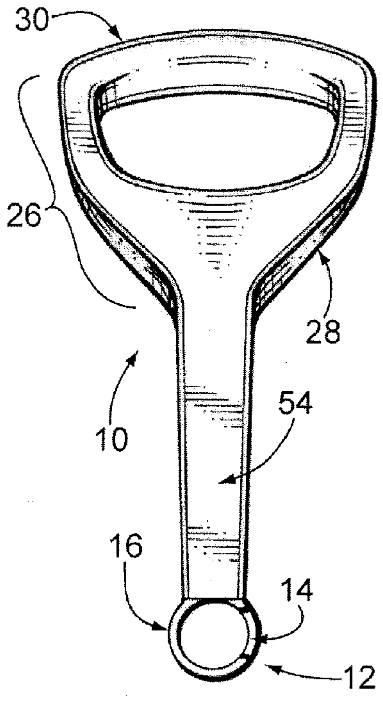

FIG. 4*a* shows a front isometric view of the Handle of FIG. 1 as viewed down the bore/shaft pathway of its Turn Collar.

Figure 4B:
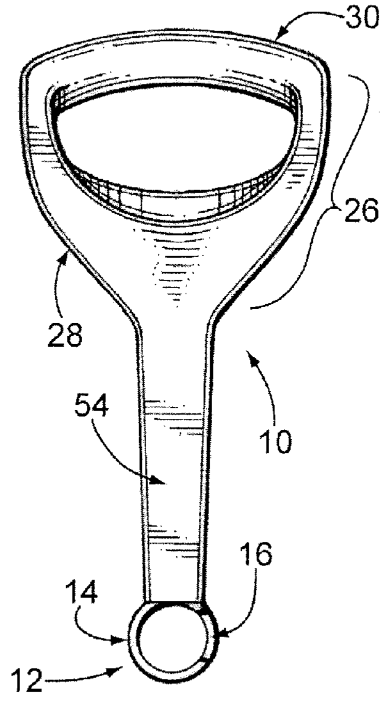

FIG. 4*b* shows a rear isometric view of the Handle of FIG. 1 as viewed down the bore/shaft pathway of its Turn Collar.

Figure 5B:
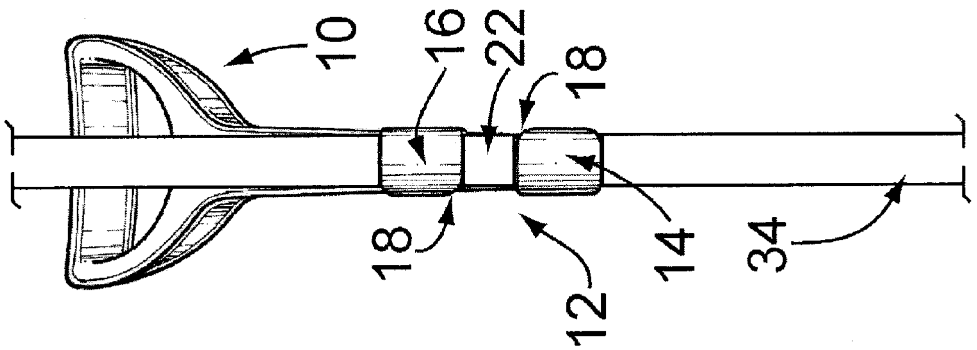
Figure 5A:
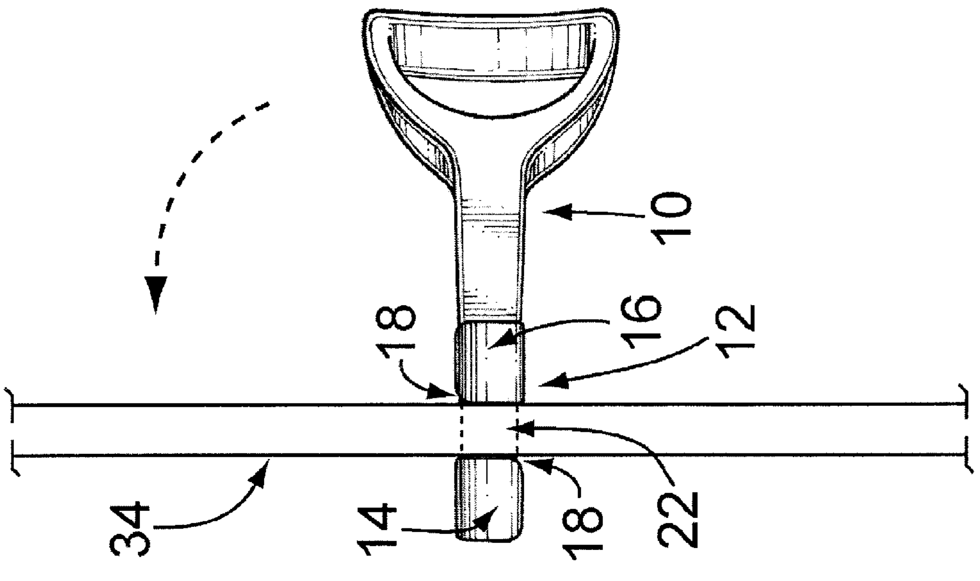

FIG. 5*a* shows a bottom isometric view of the Handle of FIG. 1 as it first fits onto an implement shaft, prior to turning.

FIG. 5*b* shows a bottom isometric view of the Handle of FIG. 1 as it is locked onto an implement shaft.

Figure 6B:
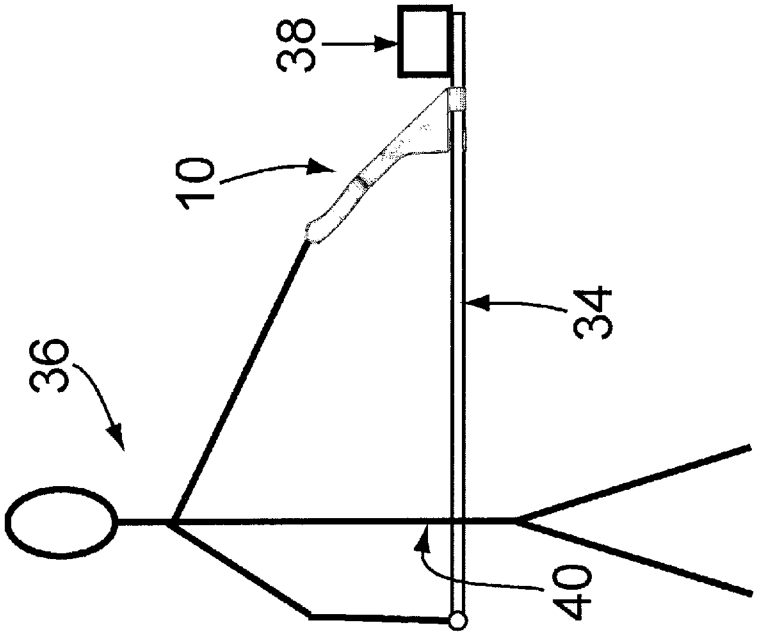
Figure 6A:
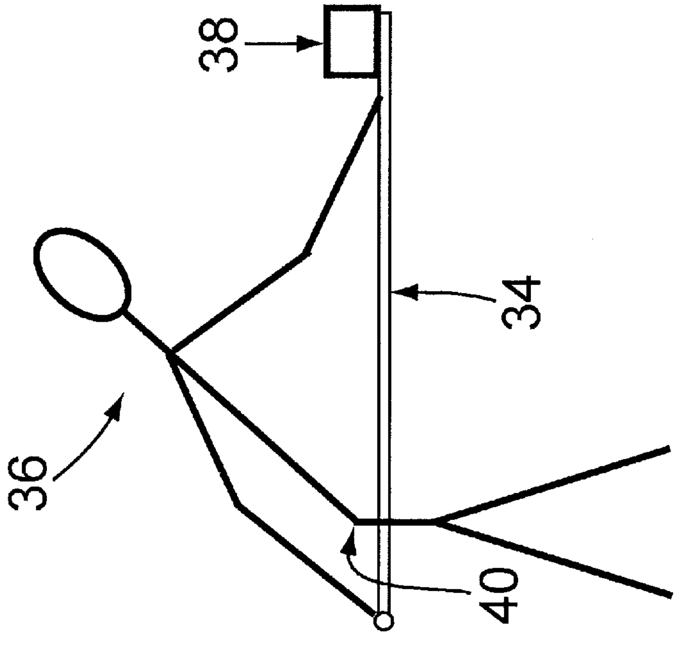

FIG. 6*a* shows a side schematic illustration of a user lifting a load by the conventional means.

FIG. 6*b* shows a side schematic illustration of a user lifting a load with the Handle of FIG. 1 attached to the shaft of an implement.

Figure 7A:
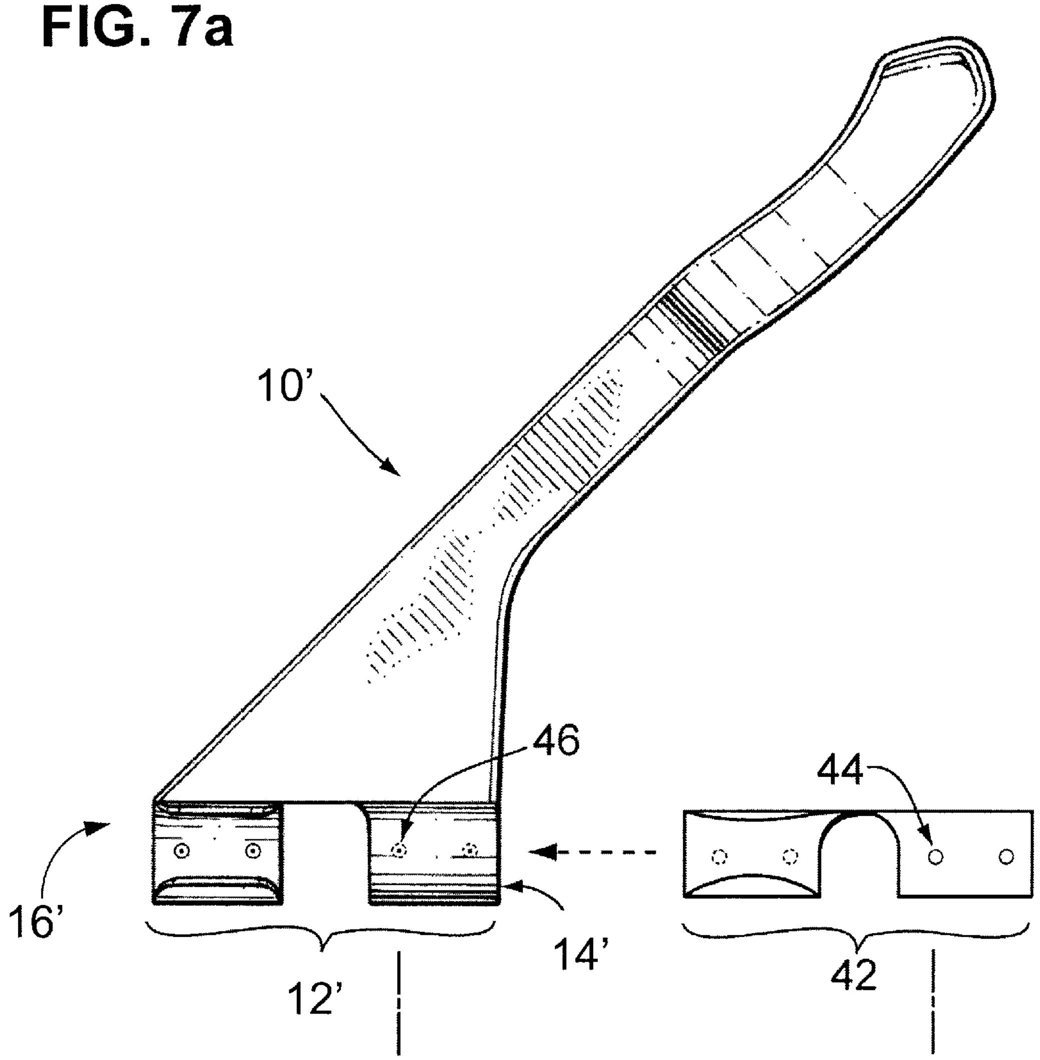

FIG. 7*a* shows side views of a sizing Insert and a first alternate embodiment of a Turn Collar Handle configured to receive the sizing insert.

Figure 7B:
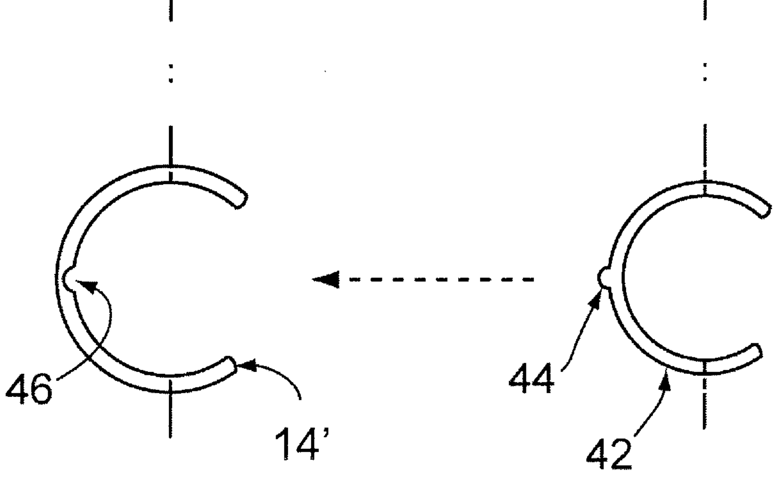

FIG. 7*b* shows enlarged views of a cross section of the Left Collar portion of the Handle of FIG. 7*a* and how the insert engages its walls.

Figure 8A:
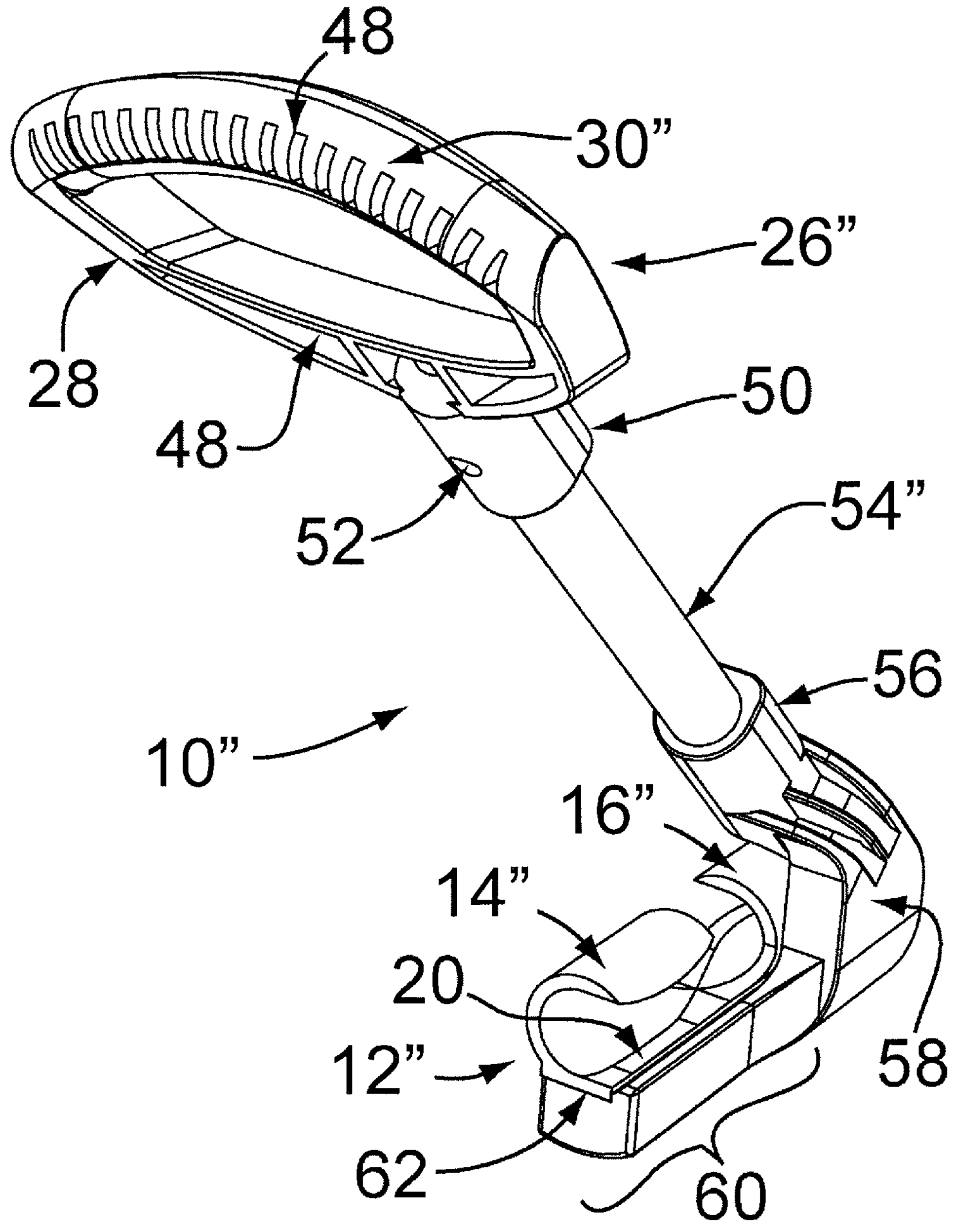

FIG. 8*a* shows a rear isometric view of a second alternate embodiment (J-Hook configuration) of a Turn Collar Handle employing a replaceable Turn Collar.

Figure 8B:
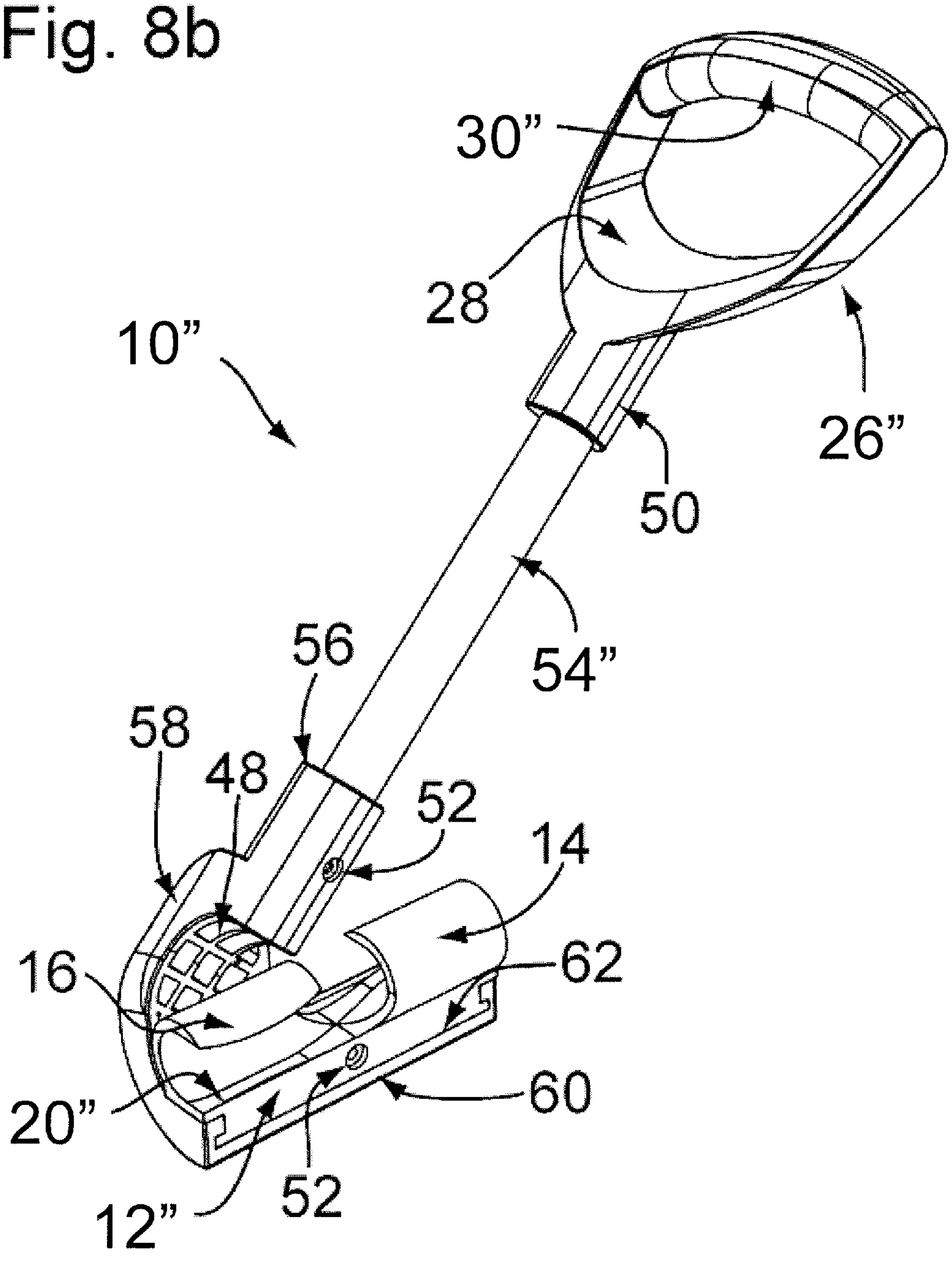
Figure 8C:
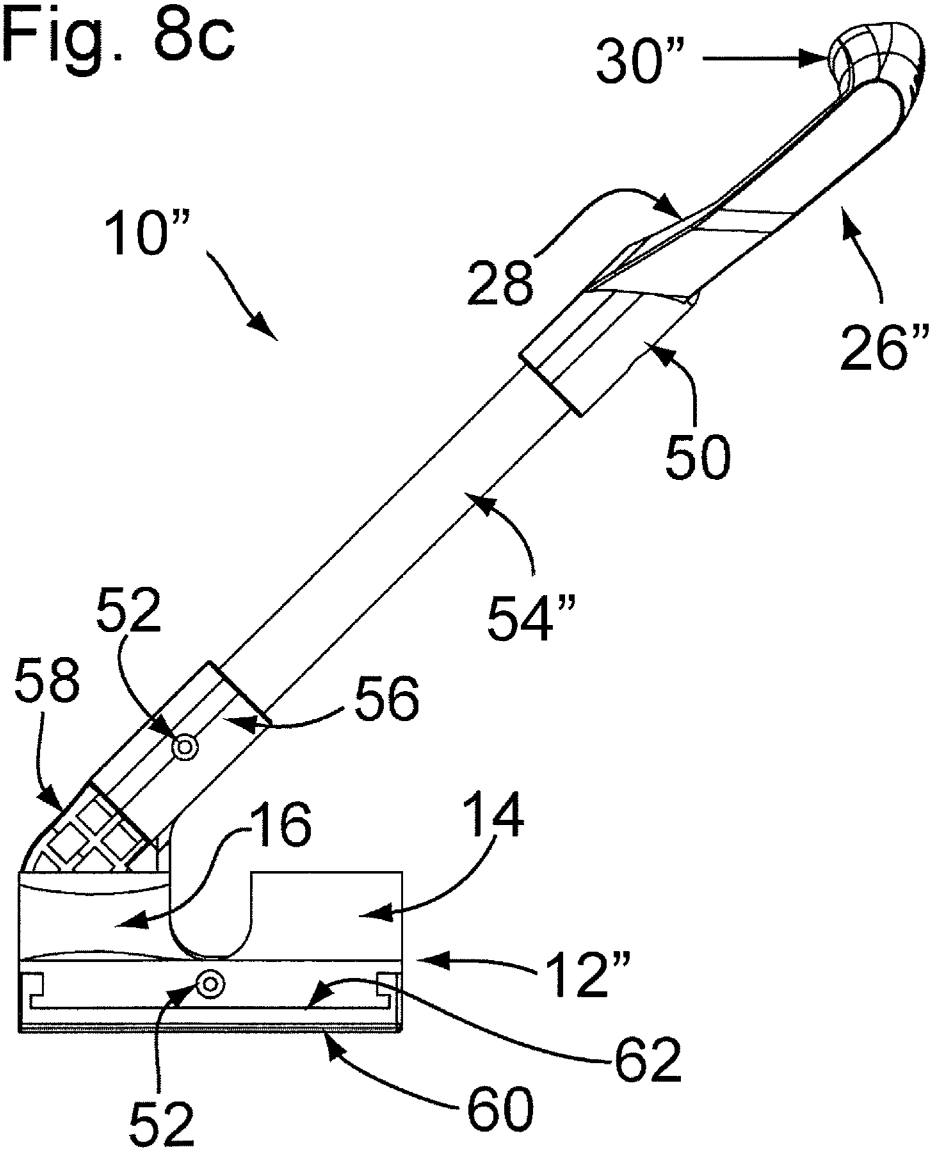

FIG. 8*b* shows a front isometric view and FIG. 8*c* shows a left side isometric view of the Handle of FIG. 8*a*.

Figure 9A:
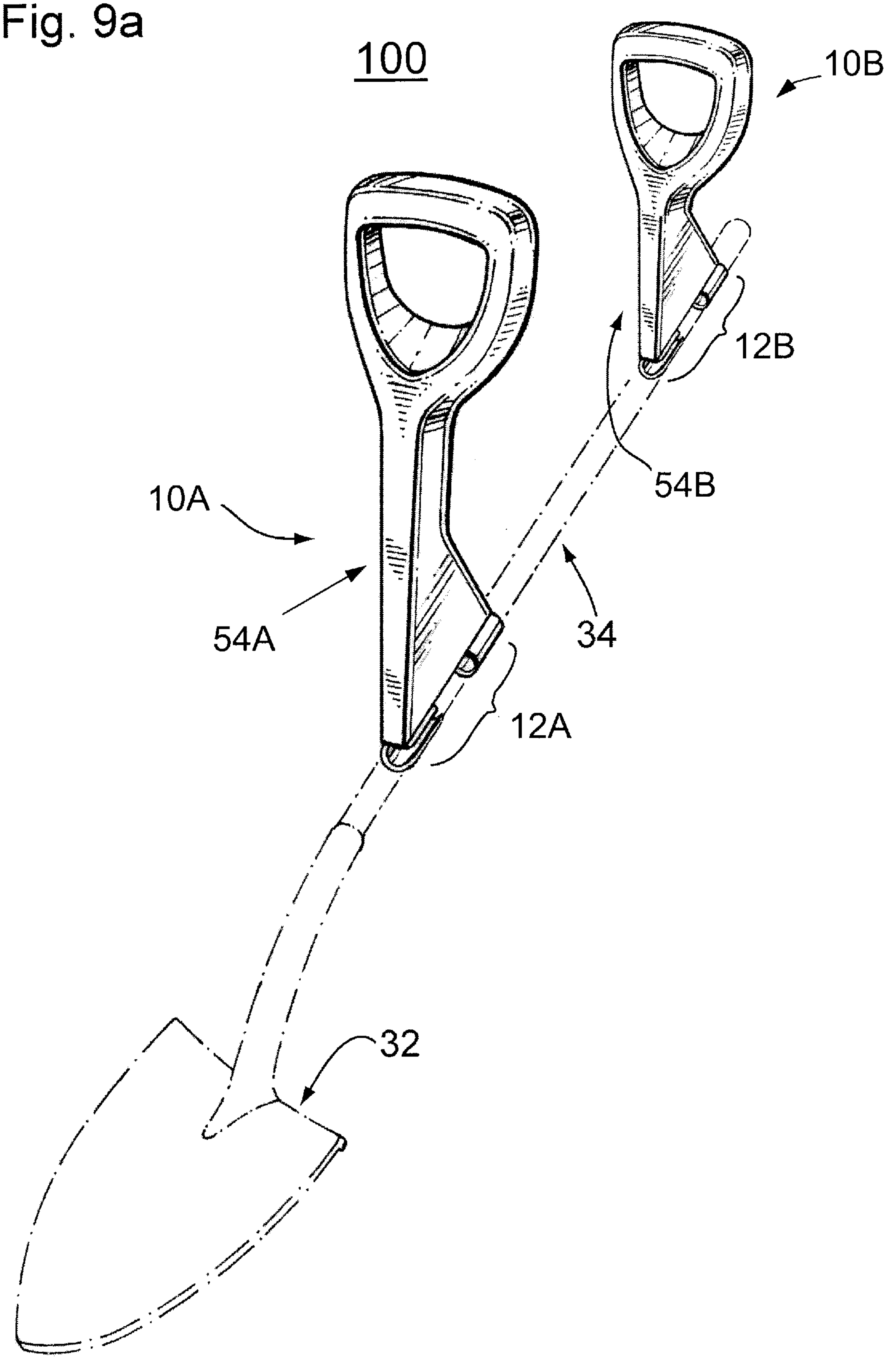

FIG. 9*a* shows a front isometric view of a set of Handles corresponding to the Handle in FIG. 1. The Handle attached to the distal end of the implement shaft is shorter than the Handle proximate the front of the implement (illustrated in dotted outline as a shovel).

Figure 9B:
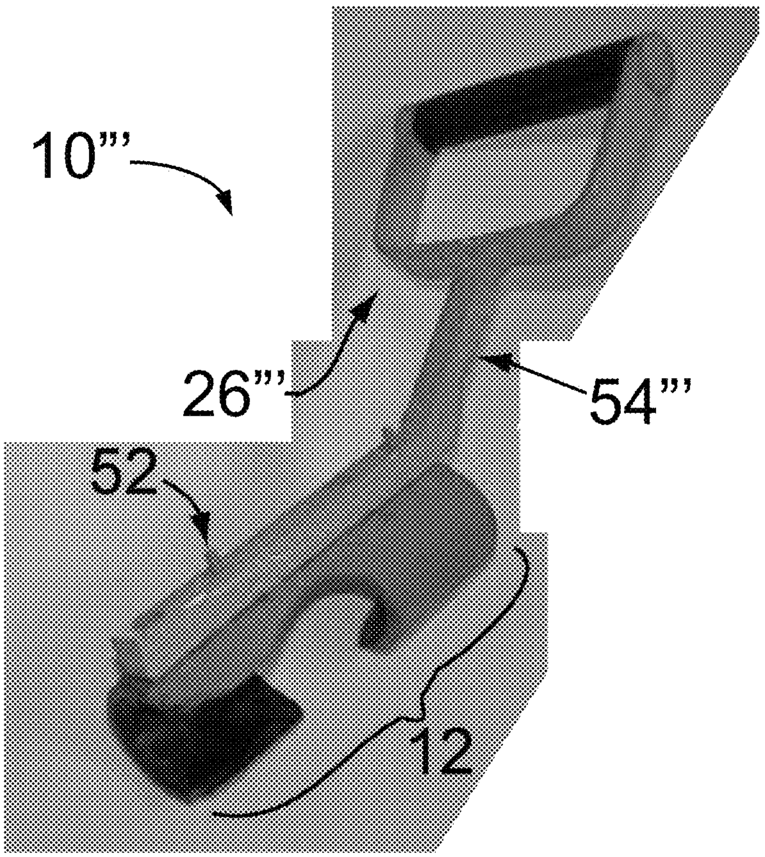

FIG. 9*b* shows a front isometric view of a third alternate embodiment of a Turn Collar Handle.

Figure 9C:
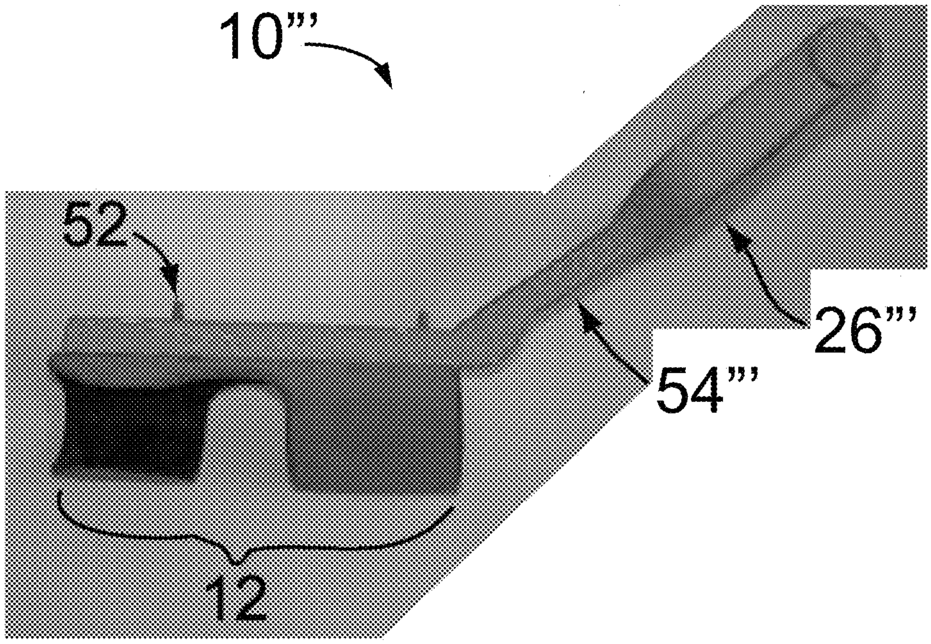

FIG. 9*c* shows a side view of the Handle of FIG. 9*b*.

DETAILED DESCRIPTION

All elements will now be introduced by reference to drawing figures, then how each element functions and interacts with each other element will be described in more detail when necessary. For sake of brevity in this disclosure, the Turn Collar Fulcrum Handle System may also be referred to herein as the TCF Handle or handle or Handle.

FIG. 1 shows a front isometric view of a first embodiment of the TCF Handle, shown generally as 10, releasably coupled or mounted by means of its turn collar 12 onto the shaft 34 of a representative implement 32 (illustrated in this example as a generic shovel).

FIG. 2*a* shows a top view of the TCF Handle 10 with its turn collar 12, a fulcrum arm 54, and a handle portion 26 with its yoke 28 and handgrip 30. As will be understood, the arm 54 is mounted to, comolded together with, or otherwise operatively coupled to the handgrip 30. Correspondingly, the collar 12 is operatively coupled to the arm 54, remote from the handgrip. FIG. 2*b* shows a bottom view of the TCF Handle 10 exposing elements of the turn collar 12, namely its left collar portion 14, right collar portion 16, spine 20 and keyway 22.

FIG. 3*a* shows a right side view of a TCF Handle 10, with the gusset 24 sides of the fulcrum arm 54, and highlighting how both collar portions have a bevel 18 as shown in the keyway 22. FIG. 3*b* shows the left side view of the TCF Handle 10. The gusset 24 reinforces the structural integrity of the TCF handle 10.

FIG. 4*a* shows a front view of a TCF Handle 10 as viewed down the bore or shaft pathway of its turn collar 12. This view also illustrates the curvilinear nature of the collar portions, 14, 16, forming a substantially cylindrical shaft pathway in this embodiment. However, it should be understood that the shaft pathway does not need to be strictly cylindrical and that other shapes and configurations may be utilized as appropriate. FIG. 4*b* shows a rear view of a TCF Handle 10 as viewed down the bore or shaft pathway of its turn collar 12.

FIG. 5*a* shows a bottom view of the TCF Handle 10 as an implement shaft 34 fits onto its keyway 22, prior to turning. FIG. 5*b* shows a bottom view of the TCF Handle 10 as its turn collar 12 is secured to the implement Shaft 34.

FIG. 6*a* shows a side view of schematic "stick figure" illustration of a user 36 lifting a load 38 on the end of a shaft 34 by conventional means. FIG. 6*b* shows a side view of a user 36 lifting a load 38 with a TCF Handle 10 attached or coupled to the shaft 34 of an implement. Note the angle of the user's 36 lower back 40 in each figure. Use of the embodiments of the handle described herein may improve a user's 36 posture and thereby help prevent associated load bearing back injuries.

FIG. 7*a* shows side views of a sizing insert 42 configured to securely fit into or seat within a collar 12' of a first alternate embodiment of a handle shown generally as 10' by means of corresponding one or more nubs 44 and one or more dimples 46. FIG. 7*b* shows enlarged views of a cross section of a Left Collar 14' and how the Insert 42 engages its walls by means of each dimple 46 configured to receive a corresponding nub 44. As will be understood, the collar 12' and correspondingly each collar portion 14', 16' is configured to receive the sizing insert 42. The use of a sizing insert 42 enables the reduction of the diameter of the shaft pathway, for use with implements having a smaller diameter than the shaft pathway of the collar 12'. As will be understood, the thickness and interior configuration of the sizing insert 42 may be determined for different applications, and for example, may be determined for use with a specific implement (and in particular the size and configuration of the shaft of such implement). As will also be understood, a set or other plurality of sizing inserts may be provided, each having a different internal shaft pathway sizing and/or configuration.

FIG. 8*a* shows a rear isometric view of a second alternate embodiment of the TCF Handle shown generally as 10" employing an interchangeable turn collar (having a J-hook configuration) 12" having collar portions 14", 16" and a reinforced spine 20" which slides into the slot 62 at the top of the stage 60 which forms the lower part of the J-Hook 58. As will be understood, the shaft pathway formed by the collar portions 14", 16" is intermediate or positioned between the spine 20" and the handgrip 30". A tubular fulcrum arm 54" is secured into the hook sleeve 56 and then handle sleeve 50 by means of fasteners 52. Note that in various portions of the design of the handle portion 26" and J-Hook assembly 58, coring 48 is present to lighten the structure and permit easy removal from plastic molds. Coring 48 can also be used to create better a gripping surface as seen on the handgrip 30". FIG. 8*b* shows a front isometric view of the same embodiment 10" and reveals how the turn collar 12" slides into the slot 62 of the stage or support portion 60 that forms part of the J-Hook 58, and its fastener 52. As will be understood, the shaft pathway formed by the collar portions 14", 16" is intermediate or positioned between the support 60 and the handgrip 30".

FIG. 8*c* shows a left side isometric view of the second alternate embodiment 10".

FIG. 9*a* shows a front isometric view of a set (shown generally as 100) of a plurality (typically two) handles, a first handle 10A and a second handle 10B, the respective arms 54A, 54B of which are of different lengths. In the illustrated example, the arm 54B of the second handle 10B, attached to the distal end of the implement shaft 34 (remote from the load being carried at the head of the shovel 32) is shorter than the arm 54A of the first handle 10A. As will be understood, each handle in the set 100 may comprise various combinations of features and configurations as contemplated herein. Furthermore, each handle in the set 100 need not (but may) share the same general configuration as every other handle in the set 100. For example, a first handle might comprise a J-hook configuration for improved weight bearing, while a second handle in the set 100 might comprise the configuration illustrated in FIG. 1.

FIG. 9*b* shows a front isometric view of a third alternate embodiment of a handle 10''' with handle portion 26''' and arm 54'''. FIG. 9*c* shows a side view of the handle 10'''.

For consistency of understanding, the following key terms will be explained, namely turn collar, implement, keyway, collar half and fulcrum handle.

In general terms, a Turn Collar, may be understood to comprise a tube or pathway (sometimes referred to herein as a "shaft pathway") defined by two substantially opposing and substantially rigid collar halves or portions connected by a spine with a central keyway the width of an implement shaft. The collar portions may be displaced axially along the shaft pathway, thereby forming the keyway between them. As will be understood, the keyway is configured or sized to receive a shaft of an implement when the shaft is substantially orthogonal to the shaft pathway. When an implement shaft is placed in the keyway of a turn collar, and the latter is turned 90 degrees, the shaft can be locked securely within the turn collar halves. Note: when the shaft engages the beveled edges of the collar halves, they are levered outwards momentarily so that when the shaft is fully seated within the turn collar, the collar halves or portions grip the shaft securely, restricting handle movement up or down the shaft, side to side handle movement, and the inadvertent and potentially dangerous release of the fulcrum handle from the shaft when loaded.

As used herein, an implement will generally be understood to refer to a tool having a shaft. The shaft of such a tool may be lengthy (but is not necessarily required to be) and may in some instances be used to lift, push, dig, lever, pull, or otherwise manipulate loads at a distance. By way of example only and without limitation, implements may include rakes, spades or shovels, brooms, pitchforks, thatchers, snow shovels, paint rollers, hoes, trowels, and hand gardening tools.

As will be generally understood, as used herein, a keyway may be in the form of an aperture in the center of turn collar where the shaft of an implement is inserted at an ergonomically appropriate position for use of the handle described herein. Turning either the turn collar or the shaft within the keyway so that opposing collar halves lock the shaft within the turn collar, the fulcrum handle is then secured to the shaft of an implement.

As used herein, a collar half or portion (sometimes referred to as a left collar and right collar as seen from user's position above the implement shaft with a TCF Handle installed) will generally be understood to refer to each half or segment of a turn collar which together with the spine enclose and secure the attached handle to a (typically cylindrical) implement shaft.

A fulcrum is the support about which a lever pivots, and in the case of a long shaft implement is the point between the user's hands gripping the shaft. By the addition of a fulcrum handle (as described in this disclosure) on the implement shaft, the fulcrum point is raised to a more ergonomic position, and (as illustrated in FIGS. 6*a* & 6*b*) reducing the risk to the user's lower back.

Some of the unique attributes and functionalities of the Turn Collar Fulcrum Handle System 10 as illustrated in this disclosure are facilitated by the simple and versatile turn collar 12 design. The turn collar 12 permits easy yet secure repositioning of a fulcrum handle without the need for any secondary attachment means or tools required. By this means, long shaft implements can be used in a safer and more ergonomic manner. As shown in FIGS. 5*a* & 5*b*, a shaft 34 is inserted into the keyway 22 gap between the left collar 14 and the right collar 16. In order for the opposing collars to securely lock the fulcrum handle onto the implement shaft, the internal diameter of the turn collar should preferably match or be slightly smaller than the diameter of the implement shaft. By this means the turn collar may be locked onto the shaft with sufficient force to secure the fulcrum handle in place. Size of the keyway 22, bevels 18 and the amount overlap of collar halves also determine how much force is required to both open the turn collar and to permit optimal securing of the handle on the shaft. When a turn collar is tailored to meet these requirements, the outcome is a fulcrum handle which may be disengaged from an implement shaft by a 90 degree rotation, and then re-engaged in a different position on the same shaft, or attached to a different implement shaft with a similar diameter.

While there is some uniformity to common long tool shaft diameters, often 1.25 inches, not all long tool shafts are the same. As shown in FIGS. 7*a* & 7*b*, an insert 42 may be used to offer more versatility in the size of shafts for which the TCF Handle 10 can attach. In this implementation, nubs 44 on the outside of the insert 42 fit into dimples 46 in the inside of the halves of the turn collar 12. Other insert 42 fastening solutions may be employed towards similar ends. Interchangeable turn collars 12 fitting different shaft diameters will be discussed in the J-Hook embodiment below.

Alternate embodiments of the Turn Collar Fulcrum Handle System 10 will now be discussed. Other embodiments are not ruled out or similar methods leading to the same result.

J-Hook Embodiment

While the embodiment illustrated and described in relation to FIG. 1 may be used to control both light and heavily loaded implements, in the latter case there is a higher risk of a loaded shaft pushing through a downward facing turn collar if the collar is not made from strong enough material. To reduce the risk of unintended detachment, a J-Hook 58 TCF Handle 10" employs an upwards facing turn collar 12", as shown in FIGS. 8*a*-8*c*. The interchangeable turn collar 12" slides into a slot 62 and is secured by a fastener 52 into a supporting stage 60 which forms part of the J-Hook 58 configuration. A hook sleeve 56 receives a fulcrum arm 54 which receives the handle portion 26 at its handle sleeve 50. By this means, the J-hook 58 embodiment supports the implement shaft 34 along the spine 20 of the J-hook configuration turn collar 12" and this is carried by the stage 60. Similar functionality is available as with the embodiment illustrated and described in relation to FIG. 1, and also includes the option of selecting from removable/releasably mountable turn collars 12" with different internal diameters for implement shafts of different diameters. Note that the fulcrum arm 54 as shown in FIGS. 8*a*-8*c* may also be constructed so as to be capable of telescopic extension in a fashion similar to walking canes with a sprung button through a series of holes. By this means, the J-Hook 58 TCF Handle 10 can provide an even broader range of ergonomic options.

Short Handle Embodiment

As shown in FIG. 9*a*, a short handle 10B is a TCF Handle with a very short or non existent fulcrum arm 54B. A short handle 10B could attach to an implement shaft mid-way for lighter applications like light a rake. As shown in FIG. 9*a*, it could also be used in a set 100 at the distal end of long shaft tools that don't have a 'D' shaped handgrip, like a rake or spade. A short handle 10B allows the top hand to grip the implement in a more ergonomically correct position.

Extension Handle Embodiment

As shown in FIGS. 9*b* & 9*c*, an extension handle 10''' is a TCF Handle where a short extension from the turn collar 12 orients the handle in line and extended away from the implement shaft 34. For example, a shovel without an end handgrip can be extended by connecting an extension handle 10''' to its distal end by its locking turn collar 12. By this means the tool can be used with more control and safety.

Materials used for constructing a turn collar fulcrum handle may depend on the loading expected on the implement shaft, as well as the environment in which the TCF Handle will be used. Hence the gusseted or the J-hook versions may be completely formed from injection molded plastics, but a high wear component such as the turn collar may be made from more durable plastic compounds, carbon fiber, metal, or similar more resilient materials.

Other advantages of using the turn collar fulcrum handle over other methods or devices will now be discussed. The TCF Handle system may enhance and improve the use of most long shaft implements by providing ergonomic use, improved safety, reduced pain and fatigue and range of motion capabilities. The TCF Handle may be used with push brooms where the handle extends reach of arms without requiring the user to bend over to create force on surface to scrub away debris. The same principle enables one to use a snow shovel with greater control and ergonomic efficiency. While lighter implements may not carry the same loads as shovels, etc., they do generate repetitive stress injuries if not used properly. The TCF Handle may improve the use of brooms, mops, rakes, and other implements that can cause injury with overuse. Another application of the TCF Handle system may permit the use of a long shaft tool when a person has an existing back injury. If such person is unable to freely bend forward, or cannot bend their legs, use of a TCF Handle may facilitate the use the long shaft tool. The various disclosed embodiments may allow for different loading applications and may also provide an ergonomic fulcrum handle. The disclosed embodiments may also provide the ability to easily reposition the handle at different points along a tool shaft or onto a different tool without secondary attachment means.

The foregoing description of the preferred apparatus and method of installation should be considered as illustrative, and not limiting. Other forming techniques and other materials may be employed towards similar ends. Various changes and modifications will occur to those skilled in the art, without departing from the true scope of the invention as defined in the present disclosure.

We claim:

1. A handle for releasable attachment to an implement, the handle comprising:

a) a handgrip;

b) an arm to which the handgrip is mounted;

c) a collar mounted to the arm remote from the handgrip and configured to releasably receive a shaft of the implement, the collar comprising:

i) two substantially opposing collar portions defining a shaft pathway;

ii) wherein the collar portions are displaced axially along the shaft pathway; and iii) a spine connecting the collar portions to each other, the spine extending axially along and beneath the shaft pathway between the collar portions.

2. The handle as claimed in claim 1, wherein the spine is reinforced.

3. The handle as claimed in claim 1, wherein the collar further comprises a stage having a slot configured to receive the spine.

4. A set of handles comprising a first handle according to claim 1 and a second handle according to claim 1, wherein the arm of the first handle is of a different length than the arm of the second handle.

5. The handle as claimed in claim 1, further comprising a sizing insert configured to seat within the collar.

6. The handle as claimed in claim 1, wherein the collar is configured to receive a sizing insert.

7. The handle as claimed in claim 6, wherein the sizing insert comprises a nub and wherein the collar comprises a dimple configured to receive the nub.

8. The handle as claimed in claim 1, wherein the arm is configured for telescopic extension.

9. The set as claimed in claim 4, further comprising a sizing insert configured to seat within the collar of at least one handle in the set.

10. The set as claimed in claim 4, wherein for at least one handle in the set: the collar is configured to receive a sizing insert.

11. The set as claimed in claim 10, wherein the sizing insert comprises a nub and wherein the collar of the at least one handle in the set comprises a dimple configured to receive the nub.

12. The set as claimed in claim 4, wherein for at least one handle in the set: the arm is configured for telescopic extension.

13. A handle for releasable attachment to an axially extending implement handle shaft, said handle comprising:

a) a collar comprising:

i) a first collar portion; and ii) a second collar portion, said second collar portion being axially spaced from said first collar portion;

b) an arm to which said collar is secured;

c) a handgrip mounted to said arm;

d) said first and second collar portions defining a shaft pathway in which to receive the shaft;

e) said first and second collar portions comprising leverable edges, said leverable edges defining locking grips restricting motion of the handle along the shaft when the shaft is seated in the shaft pathway; and f) wherein the collar further comprises a spine which extends between said first and second collar portions and to which said first and second collar portions are mounted, said spine extending axially along and beneath said shaft pathway distant from said handgrip.

14. The handle as claimed in claim 13, wherein said first and second collar portions are substantially C-shaped in cross-section when viewed axially, and said leverable edges define ends of said C-shape.

15. The handle as claimed in claim 13, wherein said first collar portion opens left-handedly and said second collar portion opens right-handedly.

* * * * *